(12) United States Patent
Mazzarolo (10) Patent No.: US 12,345,287 B2
(45) Date of Patent: Jul. 1, 2025

(54) WEARABLE PROTECTION DEVICE, METHOD OF ASSEMBLING SAID WEARABLE PROTECTION DEVICE AND MOTORCYCLE BOOT COMPRISING SAID WEARABLE PROTECTION DEVICE

(71) Applicant: Alpinestars Research S.p.A., Maser (IT)

(72) Inventor: Giovanni Mazzarolo, Coste di Maser (IT)

(73) Assignee: ALPINESTARS RESEARCH S.P.A., Maser (IT)

( * ) Notice: Subject to any disclaimer, the term of this patent is extended or adjusted under 35 U.S.C. 154(b) by 379 days.

(21) Appl. No.: 17/264,177

(22) PCT Filed: Jul. 30, 2019

(86) PCT No.: PCT/EP2019/070416
§ 371 (c)(1),
(2) Date: Jan. 28, 2021

(87) PCT Pub. No.: WO2020/025568
PCT Pub. Date: Feb. 6, 2020

(65) Prior Publication Data
US 2021/0259354 A1   Aug. 26, 2021

(30) Foreign Application Priority Data
Jul. 31, 2018 (IT) .......................... 102018000007695

(51) Int. Cl.
*F16B 5/04* (2006.01)

(52) U.S. Cl.
CPC ....... *F16B 5/045* (2013.01); *Y10T 403/32073* (2015.01)

(58) Field of Classification Search
CPC ..... Y10T 403/32155; Y10T 403/32147; Y10T 403/32139; Y10T 403/32131;
(Continued)

(56) References Cited

U.S. PATENT DOCUMENTS

| | | | | |
|---|---|---|---|---|
| 206,741 A | * | 8/1878 | Madison | ................. F16B 39/24 411/176 |
| 748,009 A | * | 12/1903 | Ramsey | ................. F16B 39/30 411/926 |

(Continued)

FOREIGN PATENT DOCUMENTS

| | | |
|---|---|---|
| CN | 101229856 A | 7/2008 |
| CN | 105324584 A | 2/2016 |

(Continued)

OTHER PUBLICATIONS

Salomon, Translation of EP 2620068 A1, 2013 (Year: 2013).*

(Continued)

*Primary Examiner* — Amber R Anderson
*Assistant Examiner* — Zachary A Hall
(74) *Attorney, Agent, or Firm* — Fredrikson & Byron, P.A.

(57) ABSTRACT

A wearable protection device including a modular frame with at least two shaped members and hinge means for hinging the shaped members therebetween at corresponding hinging points and around respective rotation axes. Each of the hinge means includes a pivot element and a disc element which are permanently coupled by riveting of the pivot element. After the riveting, the pivot element (12) is closely aligned or flush with the disc element. Also provided is a method of assembling said wearable protection device and a motorcycle boot including the wearable protection device.

11 Claims, 7 Drawing Sheets

(58) Field of Classification Search
CPC .............. Y10T 403/75; Y10T 403/645; Y10T 403/32229; Y10T 403/32065; Y10T 403/32057; Y10T 403/32073; F16B 2200/506; F16B 5/045; F16B 5/0225; F16B 5/0216; F16B 5/0088; F16B 5/0084; F16B 39/023; F16B 39/025
USPC .......................................... 411/954, 325, 271
See application file for complete search history.

(56) References Cited

U.S. PATENT DOCUMENTS

| | | | | |
|---|---|---|---|---|
| 980,823 | A * | 1/1911 | Nicols | F16B 15/04 403/387 |
| 1,052,679 | A * | 2/1913 | MacDonald | F16B 39/023 411/325 |
| 1,092,362 | A * | 4/1914 | Herkens | F16B 39/023 411/325 |
| 2,405,897 | A * | 8/1946 | Milone | F16B 19/10 29/512 |
| 3,066,348 | A * | 12/1962 | Trapman | E05F 5/027 403/156 |
| 3,356,404 | A * | 12/1967 | Peters | F16B 37/065 411/929 |
| 3,785,420 | A * | 1/1974 | Bradley | F16B 39/025 411/959 |
| 4,107,856 | A | 8/1978 | Bourque | |
| 4,444,294 | A * | 4/1984 | Yoshigai | F16D 65/092 188/24.11 |
| 4,826,378 | A * | 5/1989 | Pamer | F16B 19/04 411/338 |
| 5,567,337 | A * | 10/1996 | Ewards | F16B 39/025 219/205 |
| 9,897,136 | B1 | 2/2018 | Wu et al. | |
| 2005/0063776 | A1 * | 3/2005 | Chang | H05K 7/12 403/408.1 |
| 2011/0067271 | A1 | 3/2011 | Foxen et al. | |
| 2014/0215856 | A1 | 8/2014 | Sanderson et al. | |
| 2017/0280818 | A1 | 10/2017 | Mandon et al. | |

FOREIGN PATENT DOCUMENTS

| | | | | |
|---|---|---|---|---|
| EP | 0436444 A1 * | 7/1991 | .......... | A43B 5/0427 |
| EP | 2620068 A1 | 7/2013 | | |
| FR | 2847173 A1 | 5/2004 | | |

OTHER PUBLICATIONS

Salomon, May 21, 2004, FR 2847173 A1, Google Patents Translation (Year: 2004).*

PCT International Search Report and Written Opinion dated Sep. 6, 2019 for Intl. App. No. PCT/EP2019/070416, from which the instant application is based, 11 pgs.

* cited by examiner

WEARABLE PROTECTION DEVICE, METHOD OF ASSEMBLING SAID WEARABLE PROTECTION DEVICE AND MOTORCYCLE BOOT COMPRISING SAID WEARABLE PROTECTION DEVICE

RELATED APPLICATIONS

This application is a 35 U.S.C. 371 national stage filing from International Application No. PCT/EP2019/070416, filed Jul. 30, 2019, which claims priority to Italian Application No. 102018000007695, filed Jul. 31, 2018, the teachings of which are incorporated herein by reference.

The present invention relates to a wearable protection device designed for protecting a part of the wearer's body. Moreover, the present invention also relates to a method of assembling said wearable protection device. Further, the present invention relates to a motorcycle boot comprising said wearable protection device.

Wearable protection devices are well known in the art. An example of a wearable protection device is a protecting device configured to be coupled with a wearable article. For example, a protection device can be coupled with a motorcycle boot for protecting at least one part of a leg of the user from shocking, strikes and falls. In the case of a boot, such devices comprise a modular frame with at least two shaped members. These members have a shape which is complementary to the part of the leg to be protected and are connected therebetween by suitable hinge means.

The hinge means allow the reciprocal movement of the shaped members, so as to guarantee the freedom of movement of the leg. At the same time, in case of a strike or a fall, they are able to offer a protection to user's leg.

Further, at least one of the shaped members is stably secured to the wearable article by suitable connection means.

Usually, both the hinge means and the connection means comprise a pivot element and a disc element configured to be coupled to each other at one or more articulation points of the shaped members.

The pivot element and the disc element are preferably made of metallic material and have respective threaded and counter-threaded portions configured to be screwed for allowing their coupling.

In particular, the pivot element is screwed until its end is inserted inside a central hole formed in the disc element.

US2004/0194350, in the name of the same applicant of the present application, discloses a protection device designed to be coupled with a motorcycle boot.

This protection device comprises a modular frame with at least two shaped members articulated therebetween by suitable hinge means. Each hinge means, which is designed to connect facing surfaces of the shaped members, comprises a pivot element and a disc element.

A first drawback of the above solution is that the end of the pivot element, once inserted in the hole of the disc element, projects from the latter towards the portion of the boot to which the protection device is applied Such a drawback could cause the injury or the wound of the body part of the user facing the protection device, also considering that the pivot element is made of metallic material.

A further drawback concerns the fact that a chemical blocking compound needs to be applied on the pivot element and on the disc element in order to avoid their unscrewing.

The step for applying the compound is particularly time consuming and problematic to carry out and causes an increase of the overall working times and costs.

An object of the present invention is to provide a wearable protection device which allows to solve the above mentioned drawbacks.

In particular, an aim of the present invention is to provide a wearable protection device able to maintain a stable coupling between the shaped members avoiding sharp projecting portions of hinging and connection means.

Moreover, a further aim of the present invention is to provide a wearable protection device able to maintain a stable coupling between the shaped members, avoiding the application of a chemical blocking compound between the pivot element and the disc element.

These and other objects and aims are achieved by a wearable protection device, a method for assembling said protection device, and a motorcycle boot, each according to the claims herein.

The advantages and the characteristic features of the invention will appear more clearly from the following description of a preferred, but not exclusive, embodiment of a wearable protection device with reference to the accompanying figures in which:

FIG. 1b shows a side view, from a second point of view, of the wearable article of FIG. 1a;

FIG. 9a shows an enlarged view of the particular indicated with A in FIG. 8a;

With reference to the attached figures, a wearable protection device according to the invention is indicated as a whole by the reference 1.

This wearable protection device 1 is suitable for being used by motorcyclists, preferably by motocross riders, but it could also be used by cyclists, skiers or in other fields where an effective protection of the user's body must be obtained.

Figure 1A:
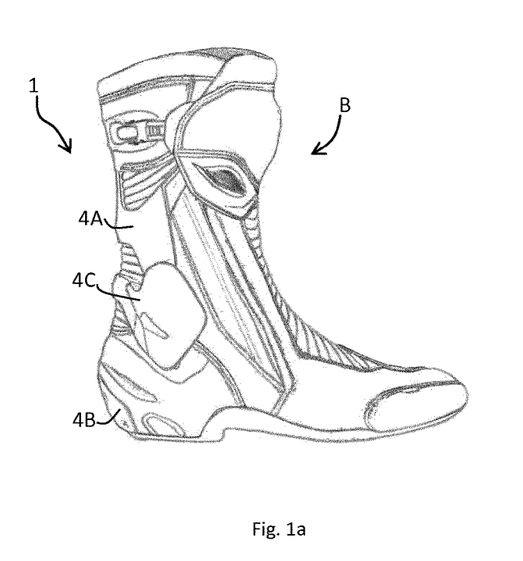
FIG. 1a shows a side view, from a first point of view, of a wearable article, in particular a motorcycle boot, with a protection device connected thereto.
Figure 1B:
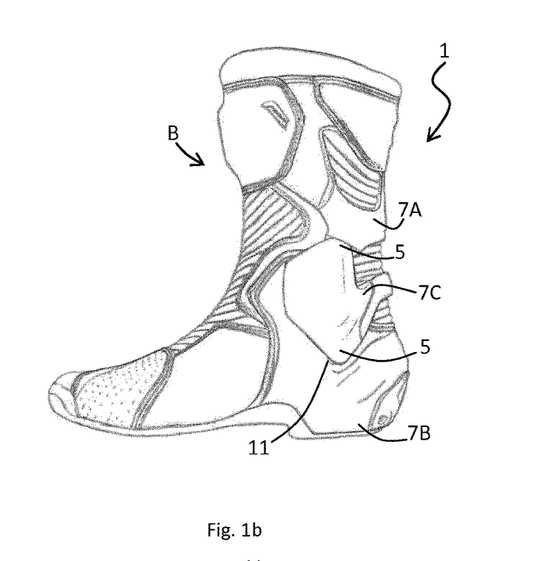

Preferably, the wearable protection device 1 is configured to be connected, by suitable connection means 2, to a protective wearable article B designed to protect a part of the wearer's body, as illustrated in FIGS. 1a and 1b.

For example, the protective wearable article can be a motorcycle boot B, a knee brace or a similar protective device.

In FIGS. 1a and 1b it is shown an embodiment of the wearable protection device 1 having the function to protect a part of the leg of the user, specifically the ankle of the user. Such an embodiment is configured to be applied to the motorcycle boot B.

Nevertheless, a wearable protection device 1 according to the invention, as it will appear more clearly from the following description, could also be used alone or in combination with different wearable articles, without prejudice to the scope of protection of the present invention.

The wearable protection device 1 according to the invention comprises a modular frame 3 with at least two shaped members 4A, 4B, 4C, coupled therebetween at correspondent hinging points 5.

In a preferred embodiment shown in figures from 2a to 9b, the modular frame 3 comprises three shaped members 4A, 4B, 4C which are pivotally connected for protecting the ankle of a user, without hindering the corresponding movements.

In particular, the frame 3 comprises an upper shaped member 4A for protecting the tibia of the user and a lower shaped member 4B for protecting the heel of the user.

Both the upper 4A and the lower shaped members 4B are pivotally connected to a medial shaped member 4C interposed therebetween.

Figure 2A:
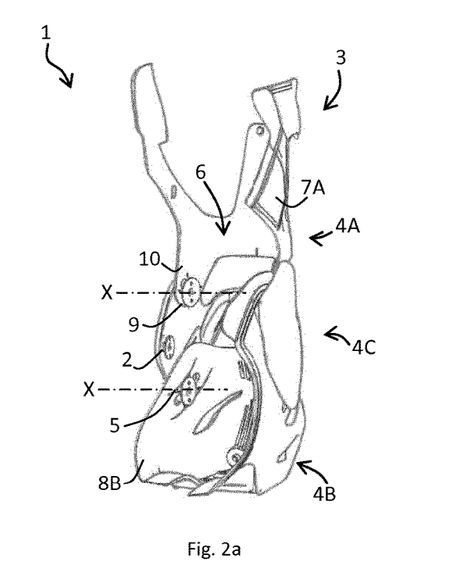
FIGS. 2a and 2b show, respectively, a perspective view and a side view, from a first point of view, of the wearable protection device according to the present invention in a first operative position.
Figure 2B:
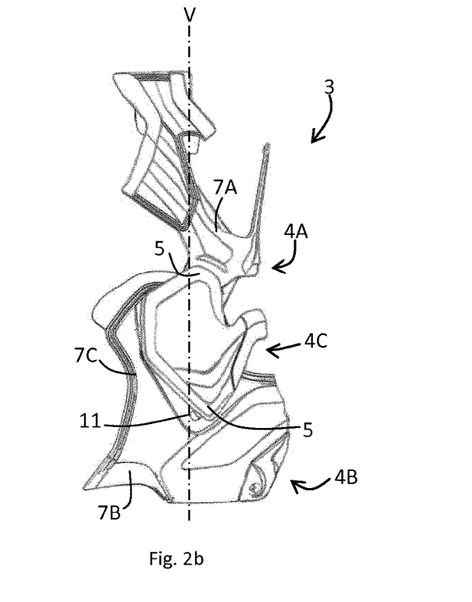
Figure 3A:
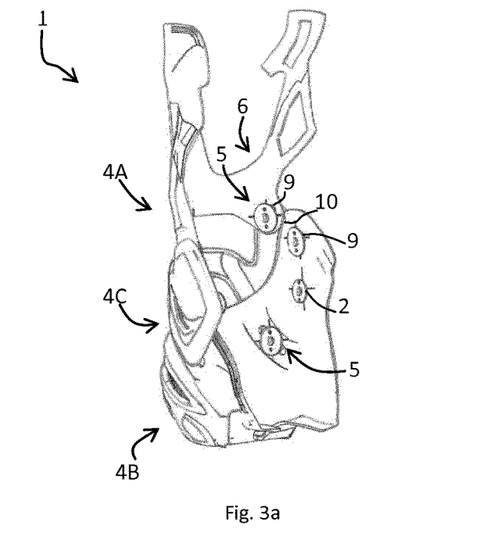
FIGS. 3a and 3b show, respectively, a perspective view and a side view, from a second point of view, of the wearable protection device of FIGS. 2a and 2b.
Figure 3B:
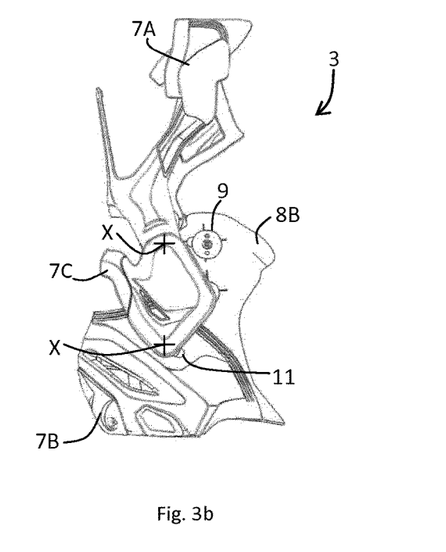
Figure 4A:
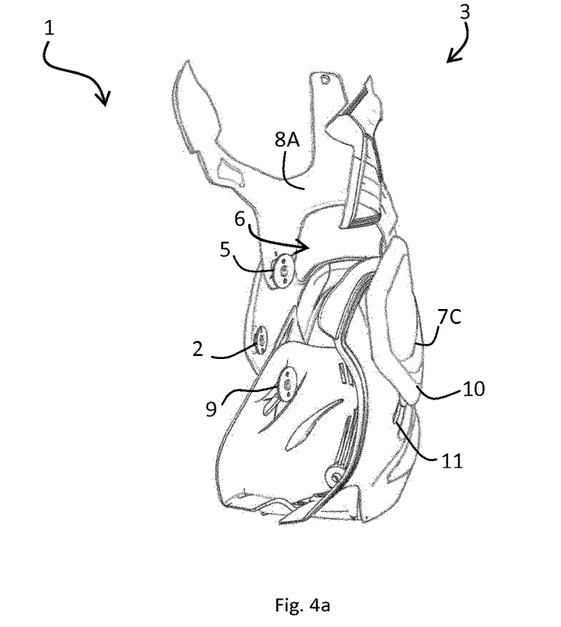
FIGS. 4a and 4b show, respectively a prospective view and a side view, from a first point of view, of the wearable protection device of FIGS. 2a and 2b in a second operative position.
Figure 4B:
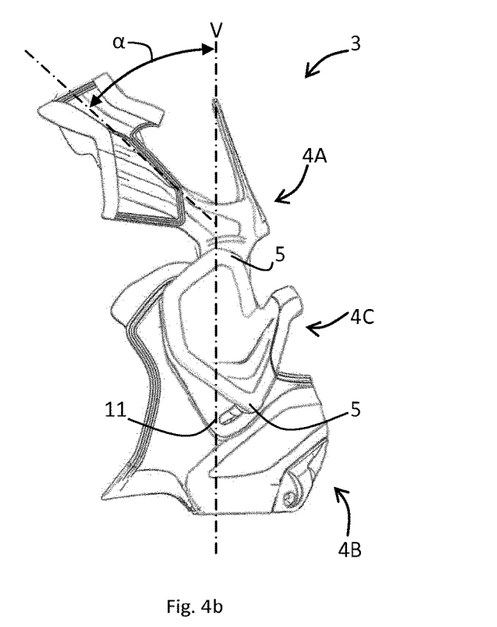
Figure 5A:
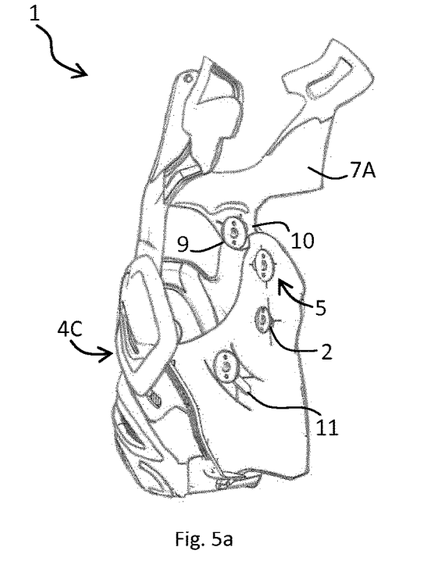
FIGS. 5a and 5b, show, respectively, a prospective view and a side view, from a second point of view, of the wearable protection device of FIGS. 4a and 4b in a second operative position.
Figure 5B:
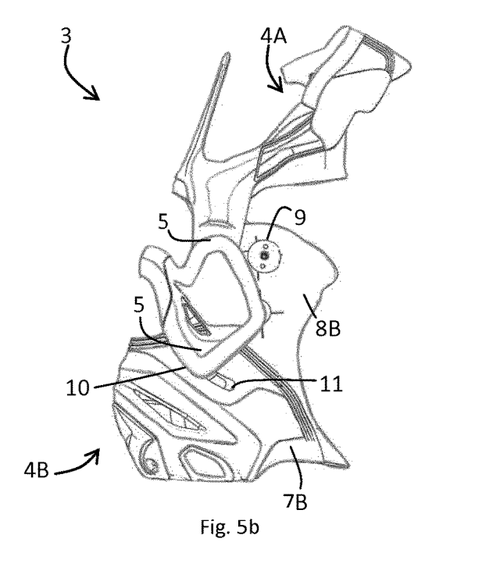
Figure 6A:
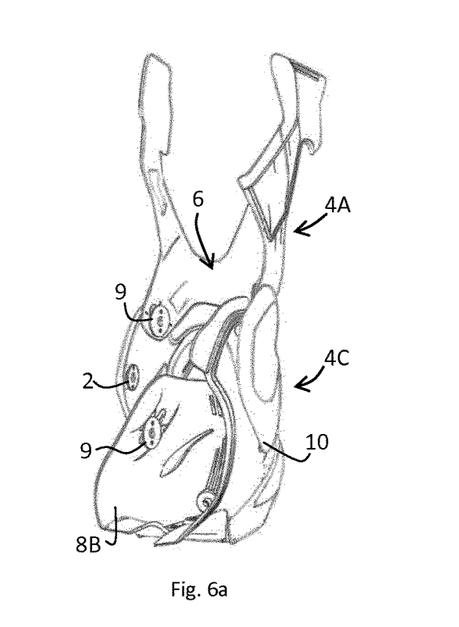
FIGS. 6a and 6b show, respectively, a prospective view and a side view, from a first point of view, of the wearable protection device of FIGS. 2a and 2b in a third operative position.
Figure 6B:
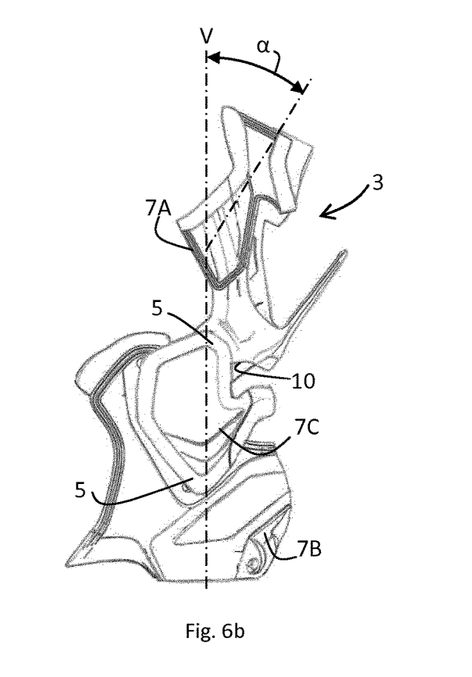
Figure 7A:
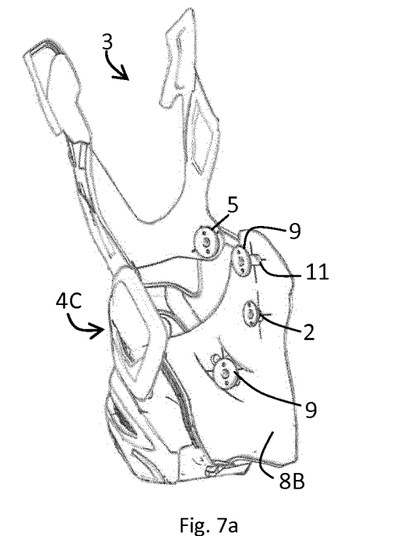
FIGS. 7a and 7b show, respectively, a prospective view and a side view, from a second point of view, of the wearable protection device of FIGS. 6a and 6b in a third operative position.
Figure 7B:
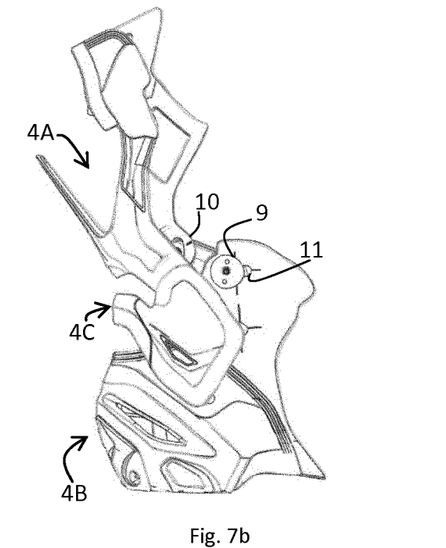

As illustrated in FIG. 2b, in the assembled configuration the three members 4A, 4B and 4C of the frame 3 define an elongated vertical axis V.

The inclination angle α of the upper member 4A and the medial member 4C can vary relative to the vertical axis V because of the pivotal connection at the hinging points 5 between the medial member 4C and the upper 4A and lower members 4C.

With respect to the vertical axis V, the upper member 4A can bend forward (as illustrated in FIGS. 4a, 4b, 5a and 5b) or rearward (as illustrated in FIGS. 6a, 6b, 7a and 7b).

The three shaped members 4A, 4B, 4C can be made of an elastomeric rigid material in order to give a better protection to the user. Preferably, the three shaped members 4A, 4B, 4C have a concave profile delimiting an inner space 6 for housing the part of the user's leg to be protected.

Further, in each shaped member 4A, 4B, 4C an outer surface 7A, 7B, 7C and an inner surface 8A, 8B, 8C can be identified. As "inner surface" there will be indicated the surface of the shaped member that, when the wearable protective device is in use, i.e. is worn by a user, is near to the body of the user, while as "outer surface" there will be indicated the surface of the shaped member that, when the wearable protective device is in use, is opposite to the inner surface.

Figure 12A:
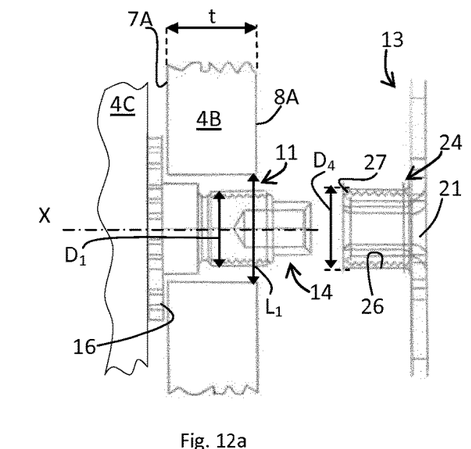
FIGS. 12a, 12b and 12c show cross-section side views of the hinge/connection means of the wearable protection device according to the present invention during three different coupling steps.

The thickness t of each member 4A, 4B, 4C, as illustrated in FIG. 12a, can be changed according to the protection degree to be given.

The number of the shaped members could also be different from that indicated above, depending on the protection requirements to be obtained, without prejudice to the scope of protection of the present invention. According to the invention, the wearable protection device 1 comprises hinge means 9 for hinging the shaped members 4A, 4B, 4C therebetween at the corresponding hinging points 5 and around respective rotation axes X, as better illustrated in FIGS. 2a, 3b, 12a and 13c.

Preferably each of the shaped members 4A, 4B, 4C has at least a pair of brackets 10 configured to be superimposed and hinged by corresponding hinge means 9 to the brackets 10 of a different shaped member 4A, 4B, 4C at the hinging points 5.

In particular, the medial shaped member 4C can have two pairs of brackets 10 configured to be coupled, respectively, with the brackets 10 of the upper shaped member 4A and the lower shaped member 4B.

According to the embodiment shown in figures from 2a to 9b, in the assembled configuration, the inner surface 8C of the medial shaped member 4C faces the outer surface 7A of the upper shaped member 4A and the outer surface 7B of the lower shaped member 4B.

Figures 13A, 13B, 13C, 14A, 14B, 14C:
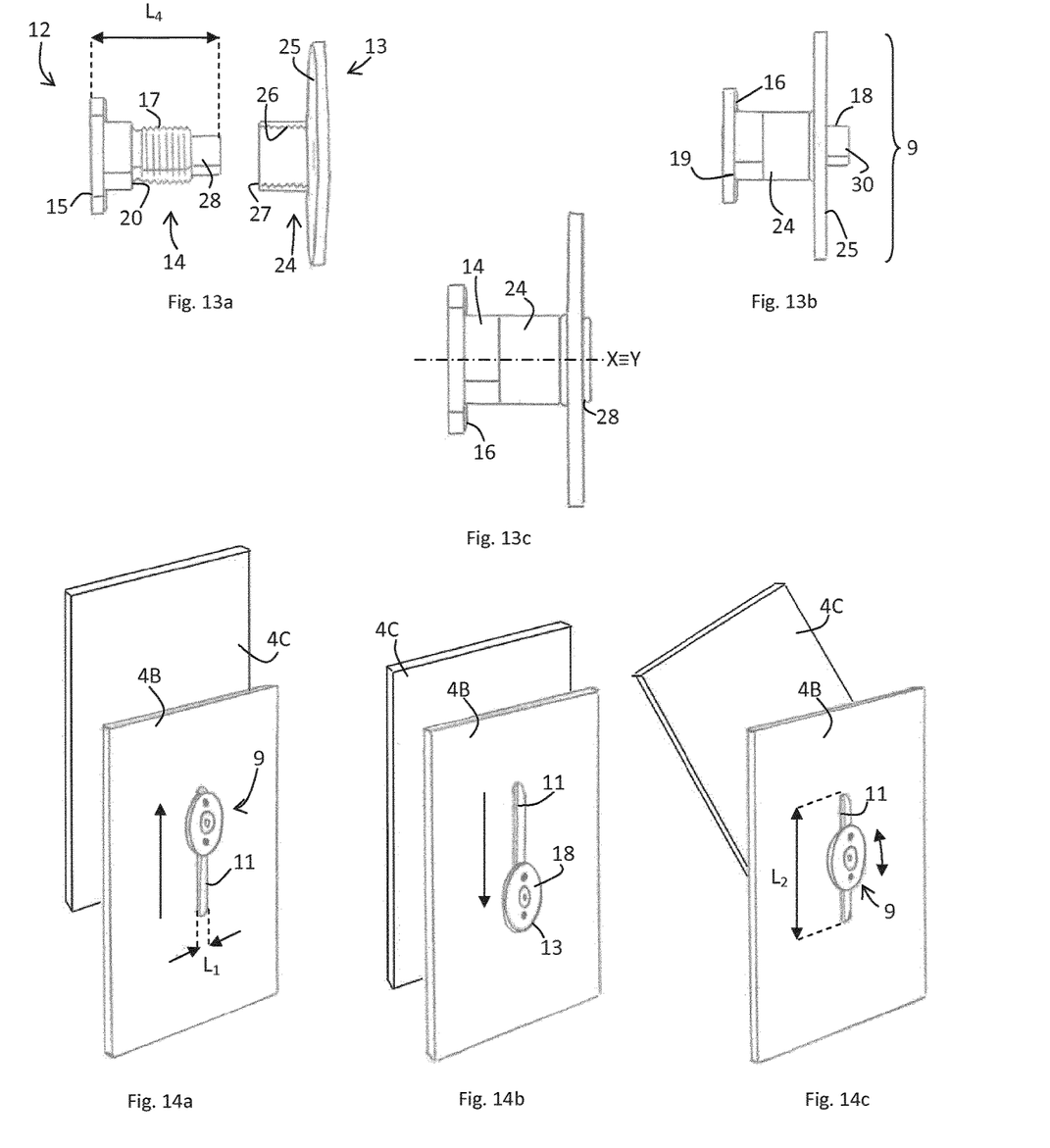
FIGS. 13a, 13b and 13c show side views of the hinge/connection means as illustrated in the corresponding FIGS. 12a-12c.
FIGS. 14a, 14b and 14c show schematic perspective views of the hinge/connection means, connected on the frame of the wearable protection device, while performing three different movements.

Advantageously, each of the brackets 10 of the upper and the lower shaped members 4A, 4B can have, at each hinging points 5, a respective elongated eyelet 11 with a predetermined width $L_1$ and length $L_2$ (as schematically shown in FIGS. 14a and 14c). As it will be clear from the following description, the width $L_1$ of the eyelet 11 will be selected in function of the dimensions of the hinge means 9, while the length $L_2$ will set up the maximum mutual sliding between two shaped members which are hinged to each other.

In particular, according to the embodiment shown in the attached figures, the hinge means 9 are configured to be secured to the medial shaped member 4C, as illustrated in FIGS. 8a, 8b, 9a and 9b and inserted into the elongated eyelets 11 of the upper or the lower shaped members 4A, 4B previously superimposed, so as to connect the shaped members to each other.

Figure 8A:
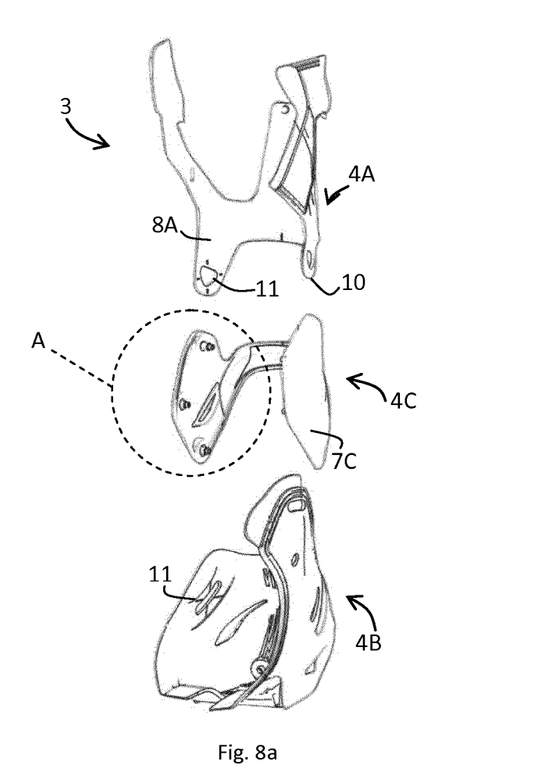
FIGS. 8a and 8b, show two exploded prospective views of the wearable protection device of FIGS. 2a and 2b from a first and a second point of view.
Figure 8B:
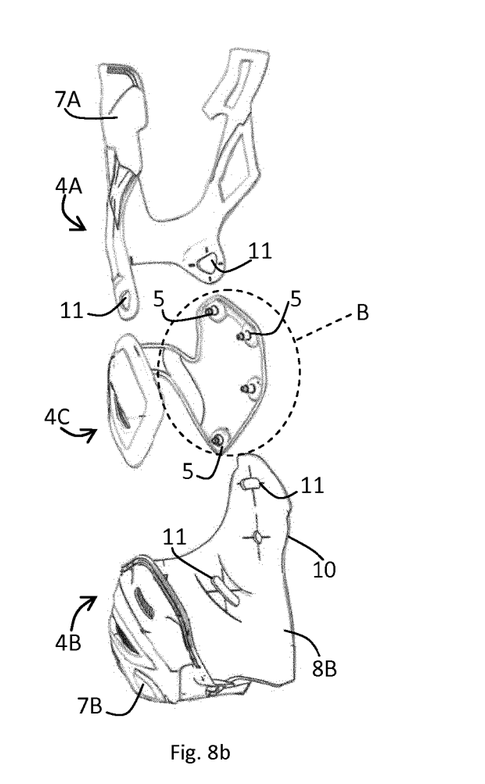

As illustrated in FIGS. 8a and 8b, the eyelets 11 of the upper member 4A may have a different shape with respect to the eyelets 11 of the lower member 4B, to provide a different mutual rotation between the shaped members.

In particular, the eyelets 11 of the member 4A in FIGS. 8a and 8b present a large tri-pole shape while the eyelets 11 of the member 4B have a line-arc shape.

The tri-pole shape has been chosen for allowing a safer movement of the ankle, since ankle rotation is not completely linear.

This particular tri-pole eyelet 11, in combination with the hinge means 9, always guarantee the connection between the members 4A and 4B while the ankle is normally doing rotation.

Figure 10:
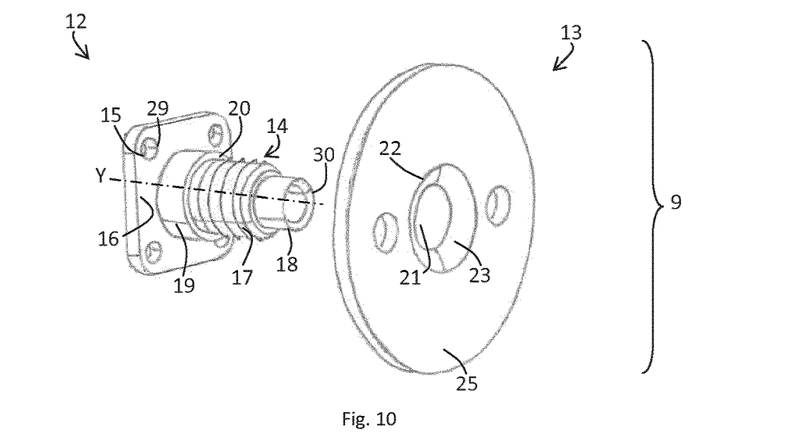
FIG. 10 shows a perspective view of the pivot and disc elements of the hinge/connection means of the wearable protection device according to the present invention.
Figure 11A:
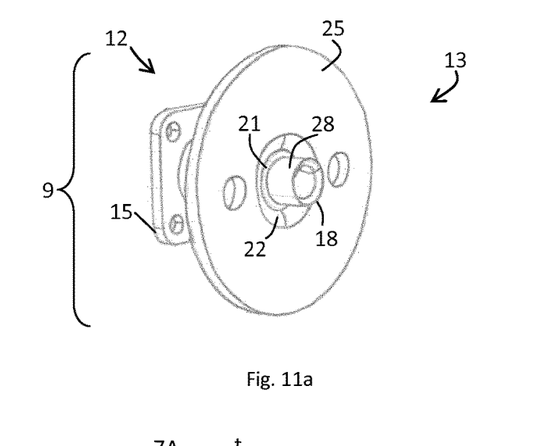
FIGS. 11a and 11b show perspective views of the pivot and disc elements as illustrated in FIG. 10 during two different coupling steps.
Figure 11B:
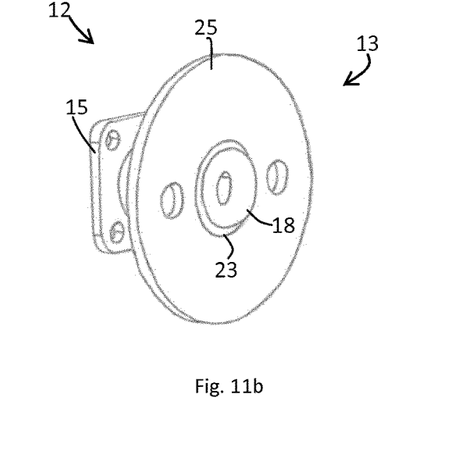

According to the invention, each of said hinge means 9 comprises a pivot element 12 and a disc element 13, preferably made with a metallic material (see FIGS. 10, 11a and 11b).

In the following, a preferred embodiment of the pivot element 12 and the disc element 13 is described with more detail.

In detail, the pivot element 12 can comprise a first axial projection 14, defining a longitudinal axis Y and projecting from a base portion 15. This latter defines a first abutting surface 16, encircling the first projection 14 (see FIG. 10).

In the embodiment shown in the figures, the base portion 15 has a square shape but other shapes could be provided without prejudice to the scope of protection of the present invention.

The base portion 15 can be configured to be fixed by means of known fastening means, not shown in the figures, to an inner surface or to an outer surface of a corresponding shaped member. Preferably, the base portion 15 can be fixed to a shaped member by means of screws designed to engage corresponding holes 29 provided in the base portion 15.

Figure 9A:
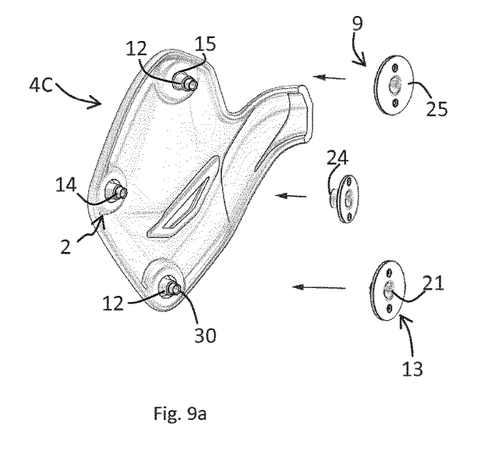
Figure 9B:
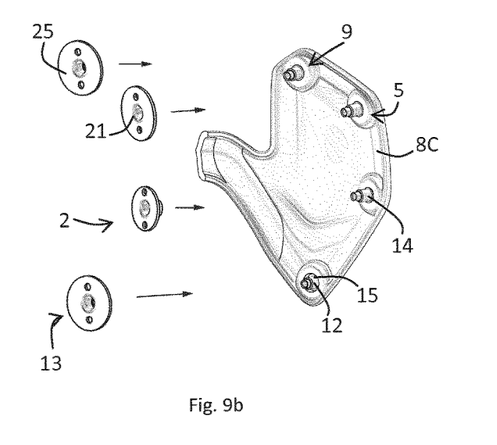
FIG. 9b shows an enlarged view of the particular indicated with B in FIG. 8b.
Figure 12B:
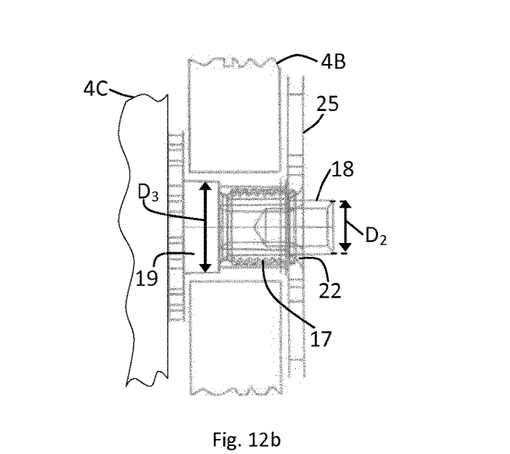
Figure 12C:
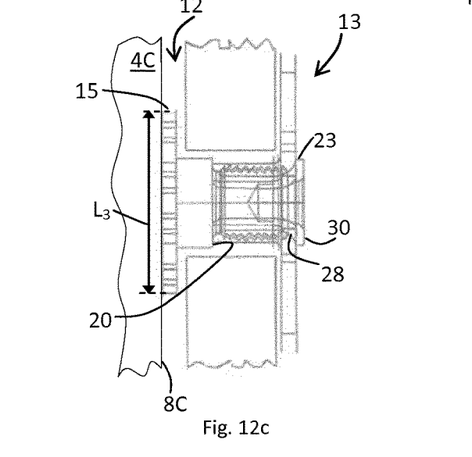

Preferably, the first axial projection 14 has portions with different diameters which are all smaller than the width $L_1$ of the eyelets 11, while the portion 15 has a transverse size $L_3$ bigger than the width $L_1$ of the eyelets 11 (see FIGS. 12a-12c). The base portion 15 of each pivot element 12 can be secured to the medial shaped member 4C at a corresponding hinging point 5, as shown in FIGS. 9a and 9b, which illustrate two separated parts of the medial shaped member 4C. The connection between the medial shaped member 4C and the base portion 15 is also schematically illustrated in FIGS. 12a, 12b and 12c.

In particular, the base portion 15 can be secured to the inner surface 8C of medial shape member 4C.

The end portions of the medial shaped member 4C, designed to be pivotally connected to the upper and lower shaped members 4A, 4B, may have a different number of hinging points 5, each hinging point being provided with respective hinge means 9, as better illustrated in FIGS. 9a and 9b.

When the medial shaped member 4C is superimposed to the upper 4A or the lower shaped member 4B, the first projection 14 of each pivot element 12 is configured to be inserted into the respective eyelet 11 at a corresponding hinging point 5.

Advantageously, the abutting surface 16 of the base portion 15, fixed to the medial shaped member 4C, is designed to face the outer surface or the inner surface of the upper 4A or lower 4B shaped member.

The first projection 14 can comprise a first portion 17, having a first diameter $D_1$, and a second or distal portion 18, opposite to the base portion 15 and having a respective second diameter $D_2$.

Preferably, the first portion 17 is provided with fastening means, such as an outer thread. Advantageously, the second portion 18 is hollow.

Moreover, as shown in the attached figures, the first diameter $D_1$ is preferably larger than the second diameter $D_2$ and both the diameters are smaller than the width $L_1$ of the corresponding elongated eyelet 11 inside which the pivot element 12 must be inserted.

Advantageously, the axial length $L_4$ of the first axial projection 14 (see FIG. 13a) is greater than the thicknesses t of the shaped member to be connected. In this way, after having inserted the first projection 14 through the eyelet 11, the end 30 of the second portion 18 will longitudinally project from the coupled shaped member.

For example, in case the pivot element 12 is fixed to the medial shaped member 4C, the second portion 18 is able to project from the inner surface 8A, 8B of the upper 4A or the lower shaped member 4B.

Further, the first projection 14 can comprise an abutting portion 19, in proximity of the base portion 15 and forming an annular ledge 20 of the first portion 17.

The diameter $D_3$ of the abutting portion 19, namely of the annular ledge 20, is greater than the diameters $D_1$, $D_2$ of the first portion 17 and the second portion 18. Moreover, the diameter $D_3$ can be smaller than the width $L_1$ of the respective eyelet 11 inside which the pivot element 12 must be inserted. In this way, the abutting portion 19 can be inserted as well in the eyelet 11.

Now, the structure of the disc element 13 will be disclosed.

As better shown in FIGS. 10, 11a-11b and 12a-12c, each disc element 13 preferably comprises a central through hole 21 for the insertion of the end 30 of the second portion 18 of a respective pivot element 12. Advantageously, the hole 21 has a respective inner wall 22 with a flared edge 23 at its end.

Each disc element 13 can comprise a second axial projection 24 (see FIG. 13a) projecting from a second abutting surface 25 and designed to be coupled with the first projection 14.

In this case, the hole 21 also extends along the second projection 24 and the flared edge 23 is formed at the opposite face relative to the second projection 24 of the second abutting surface 25.

Preferably, the second axial projection 24 has a diameter $D_4$ smaller than the predetermined width $L_1$ of the corresponding eyelet 11 inside which it must be inserted (see FIG. 12a).

Preferably, the second projection 24 is hollow and has an inner thread 26 and an end 27. In the following, it will be described how the pivot element 12 can be coupled with the disc element 13.

In particular, it will be described how, by using the pivot element 12 and the disc element 13, the medial shaped member 4C is coupled with the lower shaped member 4B, at a corresponding hinging point 5.

The same description applies as well for the coupling of different shaped members, like for example the medial shaped member 4C and the upper shaped member 4A.

In the following it is assumed that the medial shaped member 4C is partly superimposed to the lower shaped member 4B. Obviously, the same applies in case the medial shaped member 4C is positioned over the upper shaped member 4A.

With reference to FIGS. 12a, 12b and 12c, first of all, the base portion 15 of a pivot element 12 is fixed to the inner surface 8C of the medial shaped member 4C at a bracket 10.

As it is shown in the enclosed figures, the lower shaped member 4B and the medial shaped member 4C are connected to each other at three hinging points 5 (see FIG. 8b). Obviously different arrangements are possible.

In particular, the portion of the lower shaped member 4B illustrated in FIG. 9b comprises two hinging points 5 with respective eyelets 11 formed in the bracket 10 and in the inner surface 8B.

Advantageously, the corresponding brackets 10 of the medial 4C and the lower shaped member 4B are superimposed and the first projection 14 of the pivot element 12 is inserted in the corresponding eyelets 11 of the upper member 4A at the hinging points 5.

The second projection 24 of the disc element 13 to be coupled is inserted as well into the respective eyelet 11 from the outer side. In case, the inner thread 26 of the second projection 24 is configured to be screwed on the first portion 17 of the pivot element 12, as illustrated in FIGS. 12b and 13b.

The end 27 of the second projection 24 of the disc element 13 abuts against the annular ledge 20 of the pivot element 12 in order to maintain the distance between the base portion 15 of the disc element and the abutting portion 25 of the disc element 13 greater than the thickness t of the corresponding shaped member.

In this way, it is assured that the coupling between the pivot element 12 and the disc element 13 do not cause the blocking of the coupled shaped members 4C, 4A.

In this configuration, the first 14 and the second projection 24 are advantageously inserted with play and coupled through the respective eyelet 11. Moreover, the end 30 of the second portion 18 longitudinally projects from the central hole 21 of the disc element 13, as shown in FIGS. 11a, 12b and 13b.

In alternative, the pivot element 12 and the disc element 13, in particular the first projection 14 and the second projection 24 can be connected to each other by means of alternative types of connection, for example by a bayonet fitting.

Also in this kind of coupling, the first projection 14 is inserted into the second projection 24 and the end 30 of the portion 18 projects axially from the central hole 21 of the disc element 13.

After the insertion of the pivot element 12 inside the disc element 13, the second abutting surface 25 of the disc element 13 faces the inner surface 8A of the lower shaped member 4B to be coupled to the medial shaped member 4C.

According with the present invention, the pivot element 12 and the disc element 13 are permanently coupled owing to the riveting of the pivot element 12. The riveting of the pivot element 12 is carried out so as to render the pivot element 12 closely aligned or flush with the disc element 13.

In particular, the second portion 18, namely its end 30, of the pivot element 12 is configured to be riveted by a suitable tool, for example by a hammer, once the pivot element 12 and the disc element 13 are coupled as described above.

The second portion 18 is configured to be deformed inside the central hole 21 of the disc element 13 so as to lie, after riveting, against the inner wall 22.

In this way, the disc element 13 cannot be extracted from the pivot element 12 and the permanent coupling between the pivot element 12 and the disc element 13 is achieved, as shown in FIGS. 11b, 12c and 13c.

After the riveting, the end 30 of the pivot element 12 is closely aligned or flush relative to the disc element 13, in particular relative to second abutting surface 25, so as to avoid the presence of projections which could wound the leg of the user.

Moreover, this kind of permanent coupling does not need the application of particular chemical compounds for avoiding the unscrewing of the threaded and counter-threaded portions.

Advantageously, the hole 21 has an increased volume, delimited between the wall 22 and the flared edge 23, for housing the material of the second portion 18 of the pivot element 12 once it has been deformed by riveting.

The inner wall 22 of the hole 21 can have a frustoconical cross shape and the flaring edge 23 will face the second portion 18 of the first projection 14.

The inner wall 22 of the central hole 21 could have also a shape which is different from that described above, provided that the deformed portion 18 of the pivot element 12 is housed therein to allow the permanent blocking of the disc element 13 on the pivot element 12 once it has been riveted.

When the pivot element 12 and the disc element 13 are permanently coupled, the base portion 15 of the pivot element 12 and the second abutting surface 25 of the disc element 13 hold the shaped members 4B, 4C as in a package and with play. The first 14 and the second projections 24 coupled therebetween could slide inside the eyelet 11, upward or downward as schematically shown in the FIGS. 2b, 4b, 6b, 14a and 14b, so as to allow a controlled sliding of the shaped members 4A, 4C connected by the disc element 13 and the pivot element 12. The maximum sliding movement obtainable is set up by the length $L_2$ of the eyelet 11. The ends of the eyelet 11 represent the limit stops of such a sliding movement.

At the same time, the coupling between the disc element 13 and the pivot element 12 allows the mutual rotation of the shaped members 4B, 4C around the rotation axis X as shown in FIG. 14c.

The sliding and rotation movements of the shaped members 4A, 4B, 4C allow for the variation of the inclination angle α of the upper member 4A and the medial member 4C relative to the vertical axis V, as described above.

In view of this, the coupling between the shaped members 4A, 4B, 4C provides a certain freedom degree in the mutual movements between adjacent shaped members, so as not to hinder the movements of the leg part to be protected, offering at the same time an adequate protection in case of an impact.

Advantageously, each of the connection means 2 indicated above for connecting the protection device 1 with the wearable article B can be identical to the hinge means 9 described above.

In particular, as shown in FIGS. 2a-3a, 4a, 5a, 6a and 9a-9b, the connection means 2 can comprise a pivot element 12 and a disc element 13 like the ones previously disclosed. These elements can be riveted in the same way as previously disclosed, so as to avoid completely the presence of projections in the inner space 6 of the device 1 which could wound the user.

These connection means 2 can be positioned preferably on the medial shaped member 4C. Alternatively, the connection means 2 can be positioned on the upper shaped member 4A or on the lower shaped members 4B.

In case of the connection means 2, the abutting surface 25 of the disc element 13 will be directly fixed to the wearable article used in conjunction with the wearable protective device 1.

Another object of the present invention is a method for assembling the wearable protection device 1 described above.

The method comprises a step a) of providing at least two shaped members 4A, 4B, 4C; a first shaped member 4C having a pivot element 12 secured thereon at a hinging point 5 and a second shaped member having an eyelet 11.

Further, it is provided a step b) of superimposing the shaped members 4A, 4B, 4C at the hinging point 5 and inserting the pivot element 12 of the first shaped member 4C, namely the first projection 14, into the respective eyelet 11 of the second shaped member 4A

The method further comprises a step c) of coupling the disc element 13 to the correspondent pivot element 12 through the eyelet 11, preferably by screwing as indicated above.

In this way, the second portion 18 of the pivot element 12 projects from the through hole 21 of the disc element 13.

Finally, the method comprises a step d) of riveting the second portion 18 of the pivot element 12 in order to render it closely aligned or flush with the second abutting surface 25 of the disc element 13, avoiding sharp projections.

At this point of the disclosure it is clear how the predefined objects are achieved with the wearable protective device and the method for assembling it according to the invention.

As a matter of fact, the wearable protective device of the present invention comprises hinge means designed to be stably and permanently coupled to each other by riveting one of their elements, namely the pivot element.

As a matter of fact, the riveting of the pivot element allows to avoid, in the space which houses the user's leg, sharp projections which could wound the user.

Moreover, the hinge means coupled by riveting the pivot element do not need the application of a chemical blocking compound thereon in order to assure a firmly coupling.

Further, the method for assembling such protective device is particularly safe and fast.

With regard to the embodiments of the protective device and the method for assembling it described above, the person skilled in the art may, in order to satisfy specific requirements, make modifications to and/or replace elements described with equivalent elements, without thereby departing from the scope of the accompanying claims.

The invention claimed is:

1. A wearable protection device comprising:
   a modular frame with an upper shaped member and a lower shaped member pivotally connected to a medial shaped member interposed therebetween; and
   hinge means for hinging said shaped members therebetween at corresponding hinging points and around respective rotation axes, each of said hinge means comprising a pivot element and a disc element;
   wherein the pivot element and the disc element are permanently coupled by riveting of the pivot element by a hammering tool, whereby an end of the pivot element is closely aligned or flush with the disc element after riveting;
   wherein said pivot element comprises a hollow unthreaded distal portion and said disc element comprises a second internally threaded axial projection forming a central through hole, said unthreaded distal portion being designed for being inserted through said central through hole and said unthreaded distal portion being designed for being deformed by riveting after passing through said central through hole;
   wherein said pivot element comprises a base portion designed to be secured to one of said at least two shaped members;
   wherein brackets of the upper and the lower shaped members have, at each hinging point, a respective elongated eyelet with a predetermined width, the hinge means being secured to the medial shaped member and inserted into the elongated eyelets of the upper or the lower shaped members previously superimposed; and
   wherein a first axial projection of the pivot element comprises a first threaded portion having a minimum outer diameter and the unthreaded distal portion having an outer most diameter being lesser than the minimum outer diameter of the first threaded portion, both of the diameters being smaller than the width of the eyelets, while the base portion of the pivot element has a transverse size bigger than the width of the eyelets, the first axial projection of the pivot element being adapted to be inserted inside the elongated eyelet of the shaped members, the first threaded portion being adapted to be in threaded engagement with the second internally threaded axial projection of said disc element.

2. The wearable protection device as claimed in claim 1, characterized in that said central through hole has an inner wall, said distal portion of the pivot element being designed to be deformed so as to lie against said inner wall after riveting.

3. The wearable protection device as claimed in claim 2, characterized in that said central through hole has an increased volume designed for housing the distal portion of the pivot element once riveted and deformed.

4. The wearable protection device as claimed in claim 2, characterized in that said inner wall has a frustoconical cross section with a flared edge.

5. The wearable protection device as claimed in claim 1, characterized by comprising connection means for connecting said wearable protection device to a wearable article, said connection means being identical to the hinge means.

6. A motorcycle boot comprising the wearable protection device as claimed in claim 1.

7. The wearable protection device of claim 1, wherein the pivot element and the disc element are permanently coupled through riveting of the pivot element by a hammer.

8. The wearable protection device of claim 1, wherein said pivot element comprises an abutting portion interposed between the base portion and the distal portion, said abutting portion having an annular ledge for abutment of an end of the second internally threaded axial projection of the disc element.

9. The wearable protection device as claimed in claim 8, characterized in that said first axial projection of the pivot element projects from the abutting portion.

10. A method for assembling a wearable protection device, which method comprises the following steps:
    (a) providing at least two shaped members, a first shaped member having at least one pivot element secured thereto at a hinging point and a second shaped member having an eyelet;
    (b) superimposing said first shaped member to the second shaped member provided with an eyelet and inserting the pivot element into said eyelet;
    (c) coupling a disc element to said pivot element through the eyelet, with said pivot element having a portion projecting from the disc element; and
    (d) riveting the portion of the pivot element by a hammering tool in order to allow the permanent coupling thereof with the disc element and rendering an end of the distal portion closely aligned or flush relative to the disc element;
    characterized in that said portion of said pivot element comprises a hollow unthreaded distal portion and said disc element comprises a second internally threaded axial projection forming a central through hole, said unthreaded distal portion being designed for being inserted through said central through hole and said unthreaded distal portion being designed for being deformed by the riveting after passing through said central through hole; and
    in that said pivot element comprises a base portion designed to be secured to one of said at least two shaped members; and
    wherein a first axial projection of the pivot element comprises a first threaded portion having a minimum outer diameter and the unthreaded distal portion having an outer most diameter being lesser than the minimum outer diameter of the first threaded portion, both of the diameters being smaller than the width of the eyelet, while the base portion of the pivot element has a transverse size bigger than the width of the eyelet, the first axial projection of the pivot element being adapted to be inserted inside the elongated eyelet, the first threaded portion being adapted to be in threaded engagement with the second internally threaded axial projection of said disc element.

11. The method of claim 10, wherein the tool is a hammer.

\* \* \* \* \*